(12) United States Patent
Parks

(10) Patent No.: US 11,917,987 B2
(45) Date of Patent: Mar. 5, 2024

(54) JIG HEAD WITH BARBED BELLY WEIGHT

(71) Applicant: Steve Parks, Burleson, TX (US)

(72) Inventor: Steve Parks, Burleson, TX (US)

( * ) Notice: Subject to any disclaimer, the term of this patent is extended or adjusted under 35 U.S.C. 154(b) by 0 days.

(21) Appl. No.: 17/672,822

(22) Filed: Feb. 16, 2022

(65) Prior Publication Data

US 2022/0256824 A1 Aug. 18, 2022

Related U.S. Application Data

(60) Provisional application No. 63/150,837, filed on Feb. 18, 2021.

(51) Int. Cl.
*A01K 83/06* (2006.01)
*A01K 85/00* (2006.01)

(52) U.S. Cl.
CPC .......... *A01K 83/06* (2013.01); *A01K 85/1833* (2022.02)

(58) Field of Classification Search
CPC .... A01K 83/06; A01K 83/061; A01K 83/063; A01K 83/064; A01K 85/00; A01K 85/1811; A01K 85/1823; A01K 85/1831; A01K 85/1833; A01K 85/1837; A01K 85/1381
USPC ........... 43/42.29, 44.81, 42.24, 42.37, 42.38, 43/44.2, 44.4, 44.6, 44.8, 42.39
See application file for complete search history.

(56) References Cited

U.S. PATENT DOCUMENTS

| | | | | |
|---|---|---|---|---|
| 2,518,593 A | * | 8/1950 | Bell | A01K 83/06 43/44.2 |
| 2,825,174 A | * | 3/1958 | Leinonen | A01K 83/06 43/44.8 |
| 3,550,306 A | * | 12/1970 | Heitman | A01K 83/06 43/44.2 |
| 3,667,150 A | * | 6/1972 | Hearne | A01K 83/06 43/44.6 |
| 4,280,296 A | * | 7/1981 | Volenec | A01K 83/00 43/44.81 |

(Continued)

FOREIGN PATENT DOCUMENTS

EP 1813149 A1 * 8/2007 ............. A01K 83/06

OTHER PUBLICATIONS

Megabass Body Balance Jig Head (https://www.amazon.com/Megabass-Body-Balance-Head-Silver/dp/B00FQE22II/ref=pd_rhf_d_dp_s_pd_crcd_sccl_2_1/136-8202885-0147652?pd_rd_w=ZXW8H&content-id=amzn1.sym.840d50bc-9f73-460b-8793-15925b0bb70e&pf_rd_p=840d50bc-9f73-460b-8793-15925b0bb70e&pf_rd_r=FFP62TJ9) (Year: 2018).*

(Continued)

*Primary Examiner* — Timothy D Collins
*Assistant Examiner* — Maria E Graber
(74) *Attorney, Agent, or Firm* — Brian K. Yost; Decker Jones, PC

(57) ABSTRACT

A jig head for fishing, the jig head comprises a head portion comprising a tapered tip and a base, a hook having a point, a shank, and an eye adapted for attachment to a fishing line. A belly weight extending from the base comprises first and second ends defining a space between the shank and the belly weight, the space being adapted to receive a portion of a bait. The belly weight in certain embodiments is flexible such that the belly weight can be bent towards the shank and the belly weight comprises one or more shank facing barbs positioned between the first and second ends of the belly weight. The jig head comprises one or more tapered bells adapted to help secure a plastic bait in place.

11 Claims, 3 Drawing Sheets

(56) References Cited

U.S. PATENT DOCUMENTS

| | | | | |
|---|---|---|---|---|
| 4,349,979 A * | 9/1982 | Strantz | A01K 83/06 | 43/44.8 |
| 4,470,217 A * | 9/1984 | Adams | A01K 83/00 | 43/44.8 |
| 4,596,086 A * | 6/1986 | Garland | A01K 85/00 | 43/42.4 |
| 4,777,758 A * | 10/1988 | Phillips | A01K 85/02 | 43/43.2 |
| 5,339,559 A * | 8/1994 | Strobbe | A01K 85/00 | 43/44.8 |
| 5,386,661 A * | 2/1995 | Davis | A01K 83/06 | 43/44.8 |
| 5,551,185 A * | 9/1996 | Reed | A01K 85/00 | 43/42.31 |
| 5,564,220 A * | 10/1996 | Blicha | A01K 85/00 | 43/42.32 |
| 5,649,384 A * | 7/1997 | Manning | A01K 85/00 | 43/42.39 |
| D425,599 S * | 5/2000 | Lummis | D22/144 | |
| 6,240,672 B1 | 6/2001 | Huppert | A01K 85/02 | 43/44.8 |
| 6,571,508 B2 * | 6/2003 | Brinkman | A01K 83/06 | 43/4.5 |
| 6,658,785 B1 * | 12/2003 | Faulkner | A01K 83/06 | 43/44.2 |
| 8,844,190 B2 * | 9/2014 | Comeaux | A01K 85/00 | 43/42 |
| 10,398,135 B1 * | 9/2019 | Morales | A01K 85/02 | |
| 2006/0213111 A1 * | 9/2006 | Mitchell | A01K 85/00 | 43/42.39 |
| 2008/0127541 A1 * | 6/2008 | Shelton | A01K 85/00 | 43/42.13 |
| 2009/0071057 A1 * | 3/2009 | Hoyt | A01K 85/00 | 43/44.8 |
| 2013/0318859 A1 * | 12/2013 | Kusmerz | A01K 83/06 | 43/44.81 |
| 2014/0215895 A1 * | 8/2014 | Zobrosky | A01K 83/06 | 43/44.8 |
| 2017/0325435 A1 * | 11/2017 | Crescitelli | A01K 85/00 | |
| 2022/0240492 A1 * | 8/2022 | Boldt | A01K 83/06 | |

OTHER PUBLICATIONS

Egret Baits Beerbelly Jigs, Reels&Tackle.com (https://www.reelsandtackle.com/store/p323/egretbaitsbeerbelly.html) (Year: 2020).*

Bass Trix Live Trix head 2pk (https://www.tacklewarehouse.com/Basstrix_Live_Trix_Head_2pk/descpage-BXSTH.html) (Year: 2023).*

* cited by examiner

JIG HEAD WITH BARBED BELLY WEIGHT

This application claims the benefit of U.S. provisional patent application Ser. No. 63/150,837 filed Feb. 18, 2021, the contents of which are incorporated by reference herein in their entirety.

BACKGROUND OF THE INVENTION

1. Field of the Invention

The present invention relates generally to fishing hooks and specifically to a jig head with a belly weight comprising barbs.

2. Description of the Prior Art

Fishing with artificial lures is convenient and productive for the angler. Live bait must be kept alive and replenished frequently from a bait shop or other source. Artificial lures do not require the same care. Many artificial lures are attractive to fish when fished with skill and are productive in catching fish.

One type of lure includes a jig head. The jig head provides both a hook and a weight. The weight allows the lure to be cast out some distance and provides control of depth of the lure on retrieval. One type of jig head comprises a belly weight. A belly weight permits the jig head and bait to maintain a desired position upon retrieval such that an eye (to which the fishing line is attached) is closer to the water surface and the belly weight closer to the earth. With conventional jig heads, the plastic bait tends to work its way away from the shank.

What is needed is a jig head that permits the plastic bait to remain in a desired position on the shank.

SUMMARY OF THE INVENTION

The present invention provides a jig head comprising a belly weight comprising an elongated configuration and one or more barbs or spike-like projections.

The jig head of the preferred embodiment generally comprises a head portion, a front eye for attachment to a fishing line, a belly weight, and a hook. In the preferred embodiment, the head portion comprises a tapered tip and a base. In certain embodiments, the base comprises a recessed portion.

The base is positioned rearward of the eye. The hook extends from the base. The hook has a shank, a bend, and a point. The shank and the bend lie in a plane. The shank may, in some embodiments, comprise one or more tapered bells to aid in maintaining a soft plastic bait in position. For most hooks, the point will lie in the same plane. Extending from the head portion is the belly weight. The belly weight comprises one or more barbs extending at a forward angle from the belly weight.

The belly weight of the preferred embodiment comprises first and second ends, the first end extending from the base. The belly weight second end defines a space between the shank and the second end. The space is adapted to receive a portion of a bait threaded in a conventional manner over the hook. The one or more barbs are structured and arranged to face the shank. In the preferred embodiment, there are two barbs.

The jig head of the preferred embodiment is typically made of metal such as lead or steel. In the preferred embodiment, the head is made of lead.

In some embodiments, the head portion is formed from lead and the hook is formed from steel.

In certain embodiments, the belly weight is moveable such that the belly weight can be hingedly pressed inward towards the shank. Thus, a soft bait threaded onto the hook is contacted and maintained in position by the barbs of the belly weight as well as the tapered bells.

In certain embodiments, the jig head comprises a neck portion extending from the head portion. In such embodiments, the shank extends coaxially through the neck portion. The neck portion, in such embodiments, comprises the one or more tapered bells to aid in maintaining a soft plastic bait in position.

In certain embodiments, the recessed portion is adapted to receive an end of a plastic bait such that the end of the plastic bait nests within the recessed portion.

In preferred embodiments, the head portion, neck, and belly weight are formed from a unitary piece of material with the hook partially embedded within the head and neck portions.

DESCRIPTION OF THE PREFERRED EMBODIMENT

Referring to FIGS. 1-8, there is shown the jig head 12 in accordance with preferred embodiments. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

Figure 1:
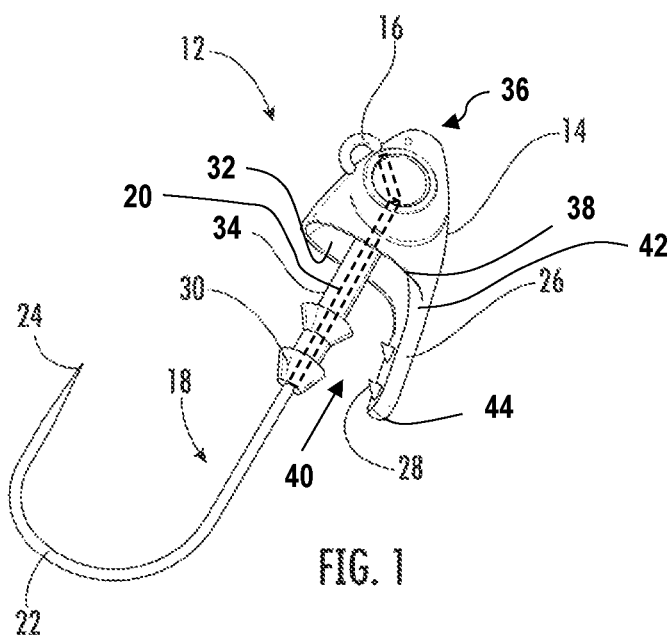
FIG. 1 is a right-side isometric view of the jig head of the present invention, in accordance with a preferred embodiment.
Figure 2:
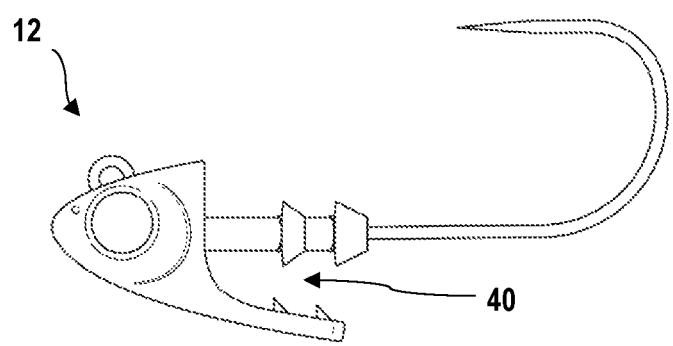
FIG. 2 is a left side elevation view of the jig head of FIG. 1.
Figure 3:
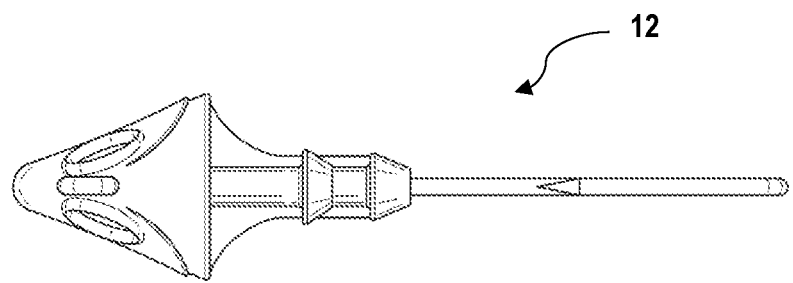
FIG. 3 is a plan view of the jig head of FIG. 1.
Figure 4:
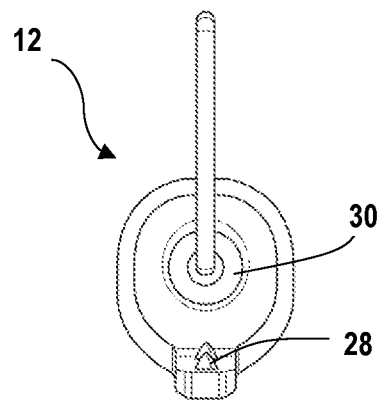
FIG. 4 is a hook-end elevation view of the jig head of FIG. 1.
Figure 5:
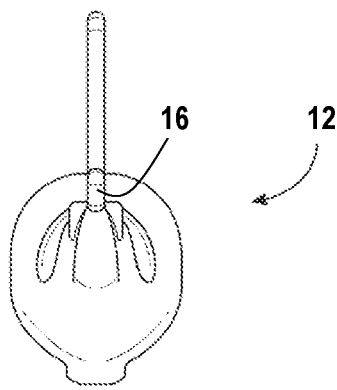
FIG. 5 is a head-end elevation view of the jig head of FIG. 1.
Figure 6:
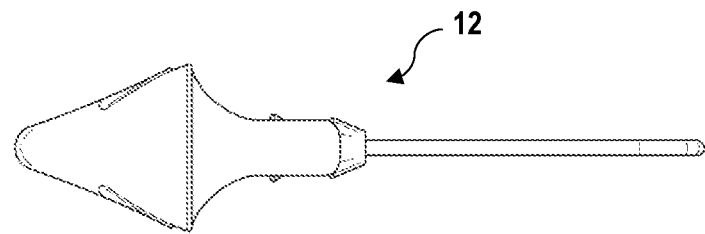
FIG. 6 is a bottom view of the jig head of FIG. 1.

Referring to the figures, and as best shown in FIG. 1, the jig head 12 of the preferred embodiment generally comprises a head portion 14, a front eye 16 for attachment to a fishing line, a belly weight 26, and a hook 18. In the preferred embodiment, the head portion 14 comprises a tapered tip 36 and a base 38. In certain embodiments, the base 38 comprises a recessed portion 32.

The base 38 is positioned rearward of the eye 16. The hook 18 extends from the base 38. The hook has a shank 20, a bend 22 and a point 24. The shank 20 and the bend 22 lie in a plane. For most hooks, the point 24 will lie in the same plane. The shank 20 may, in some embodiments, comprise one or more neck barbs, which, in preferred embodiments are tapered bells 30 to aid in maintaining a soft plastic bait in position. Each of the tapered bells 30 is wider nearer the head 14.

Extending from the head portion 14 is the belly weight 26. In the preferred embodiment, the belly weight 26 lies in the same plane as the shank 20, the bend 22, and the point 24. The belly weight 26 comprises one or more barbs 28 extending at a forward angle from the belly weight 26. The belly weight 26 of the preferred embodiment comprises first and second ends 42, 44, the first end 42 extending from the base 38 (from the recessed portion 32 in certain embodiments). The belly weight 26 second end 44 and shank 20 define a space 40 between the shank 20 and the second end 44. The space 40 is adapted to receive a portion of a bait threaded in a conventional manner over the hook 18. The one or more barbs 28 are structured and arranged to face the shank 20. In the preferred embodiment, there are two barbs 28.

In certain embodiments, the recessed portion 32 is adapted to receive an end of a plastic bait such that the end of the plastic bait nests within the recessed portion 32.

In certain embodiments, the jig head 12 comprises a neck portion 34 extending from the head portion 14. In such embodiments, the shank 20 extends coaxially through the neck portion as shown, for example, in FIG. 7. The neck portion 34, in such embodiments, comprises the one or more tapered bells 30 to aid in maintaining a soft plastic bait in position. In preferred embodiments, the head portion 14, neck 34, and belly weight 26 are formed from a unitary piece of material with the hook 18 partially embedded within the head and neck portions 14, 34. The belly weight 26 second end 44 and neck 14 define the space 40 between the neck 34 and the second end 44.

Figure 7:
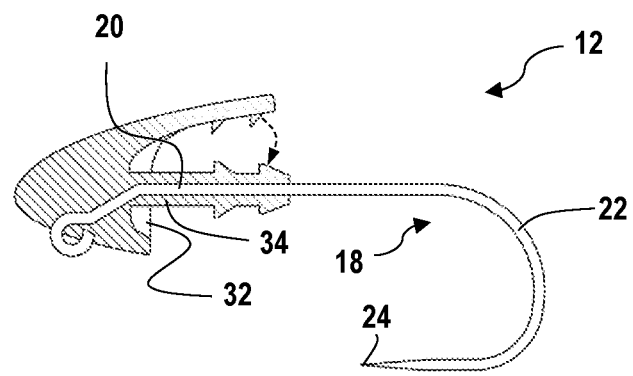
FIG. 7 is a partial sectional view of the jig head of FIGS. 1 and 2.
Figure 8:
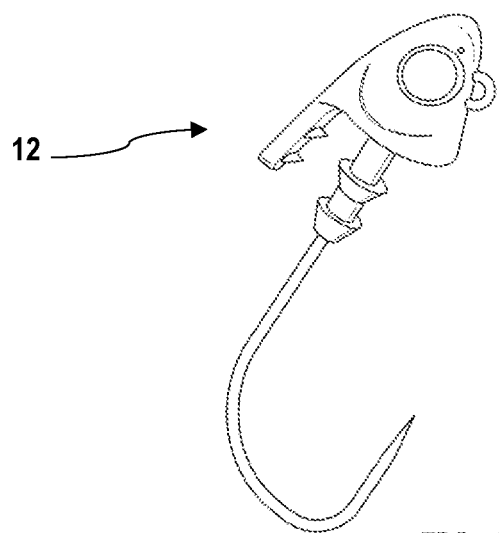
FIG. 8 is a left-side isometric view of the jig head of FIG. 1.

The jig head 12 of the preferred embodiment is typically made of metal such as lead or steel. In the preferred embodiment, the head portion 14, neck 34, and belly weight 26 are made of lead. The hook 18 is formed from steel. In one aspect of the invention, the belly weight 26 is flexible such that it is adapted to be bent towards the shank 20 (FIG. 7). Thus, a soft bait threaded onto the hook 18 is contacted and maintained in position by the barbs 28 of the belly weight 26 as well as the tapered bells 30. The belly weight 26 can also be bent back away from the shank 20, when for example, the user desires to remove the soft bait from the hook.

In certain embodiments, there are two tapered bells 30 and two barbs 28 on the belly weight. 26, and the lower barb 28 is adapted to be positioned between the first and second tapered bells 30, 30 when the belly weight 26 is bent towards the shank 20 or neck 34. In other embodiments, the upper barb 28 is adapted to be positioned between the first and second tapered bells 30, 30 when the belly weight 26 is bent towards the shank 20 or neck 34. The arrangement wherein one of the barbs 28 is positioned between the tapered bells 30 helps secure the plastic bait in position.

While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of this disclosure.

The invention claimed is:

1. A jig head for fishing, the jig head comprising:
a head portion, a neck portion, and a belly weight;
the belly weight comprising one or more belly weight barbs;
the head portion comprising a tapered tip and a base;
the jig head further comprising a hook comprising a point, a shank, and an eye, the eye being adapted for attachment to a fishing line;
the shank of the hook extending coaxially through the neck portion;
the belly weight comprising first and second ends, the first end extending from the base;
the second end defining a space between the neck portion and the second end, the space being adapted to receive a portion of a bait; and
the belly weight being flexible such that the belly weight can be bent towards the neck so that, the belly weight, when a soft bait is threadedly positioned on the hook, contacts the soft bait and maintains the soft bait in position on the hook and such that the belly weight can be bent away from the shank so that the soft bait can be removed from the hook.

2. The jig head of claim 1, the head portion, neck portion and belly weight being formed from a unitary piece of metal material.

3. The jig head of claim 1, the one or more belly weight barbs being positioned between the first and second ends of the belly weight and being structured and arranged to face the neck.

4. The jig head of claim 3, the neck portion comprising one or more neck barbs.

5. The jig head of claim 4, the one or more neck barbs comprising one or more tapered bells, the one or more tapered bells each comprising first and second ends, the respective tapered bell first ends being wider than the respective tapered bell second ends such that the one or more tapered bells are adapted to secure the soft bait in position when the soft bait is threadedly positioned on the hook.

6. The jig head of claim 5, the respective tapered bell first ends being positioned closer to the tapered tip of the head portion than the respective tapered bell second ends.

7. The jig head of claim 6, the one or more tapered bells comprising first and second tapered bells, the one or more belly weight barbs comprising first and second belly weight barbs, at least one of the first and second belly weight barbs being adapted to be positioned between the first and second tapered bells when the belly weight is bent towards the neck.

8. A jig head for fishing, the jig head comprising:
a head portion, a neck portion, and a belly weight;
the head portion comprising a tapered tip and a base;

the jig head further comprising a hook comprising a point, a shank, and an eye, the eye being adapted for attachment to a fishing line;

the shank of the hook extending coaxially through the neck portion;

the belly weight comprising first and second ends, the first end extending from the base;

the second end defining a space between the neck portion and the second end, the space being adapted to receive a portion of a bait;

the belly weight being flexible such that the belly weight can be bent towards the neck portion so that, the belly weight, when a soft bait is threadedly positioned on the hook, contacts the soft bait and maintains the soft bait in position on the hook and such that the belly weight can be bent away from the shank so that the soft bait can be removed from the hook;

the belly weight comprising one or more barbs, the one or more barbs being positioned between the first and second ends of the belly weight and being structured and arranged to face the neck portion; and the neck portion comprising first and second tapered bells structured and arranged to secure the soft bait in position when the soft bait is threadedly positioned on the hook, the first and second tapered bells each comprising first and second ends, the respective tapered bell first ends being wider than the respective tapered bell second ends, the respective tapered bell first ends being positioned closer to the tapered tip of the head portion than the respective tapered bell second ends.

9. The jig head of claim 8, the hook comprising a bend, the belly weight lying in the same plane as the shank, the bend, and the point.

10. The jig head of claim 8, the base comprising a recessed portion adapted to receive an end of the soft bait such that the end of the soft bait nests within the recessed portion.

11. The jig head of claim 8, the one or more barbs comprising first and second barbs, at least one of the first and second barbs being adapted to be positioned between the first and second tapered bells when the belly weight is bent towards the neck.

* * * * *